Aug. 12, 1969     D. A. PANNELL     3,461,331
COIL END SUPPORTS FOR SALIENT POLE ROTOR

Filed Feb. 8, 1968     4 Sheets-Sheet 1

INVENTOR
DENNIS A. PANNELL
BY
ATTORNEYS

Aug. 12, 1969  D. A. PANNELL  3,461,331
COIL END SUPPORTS FOR SALIENT POLE ROTOR
Filed Feb. 8, 1968  4 Sheets-Sheet 2
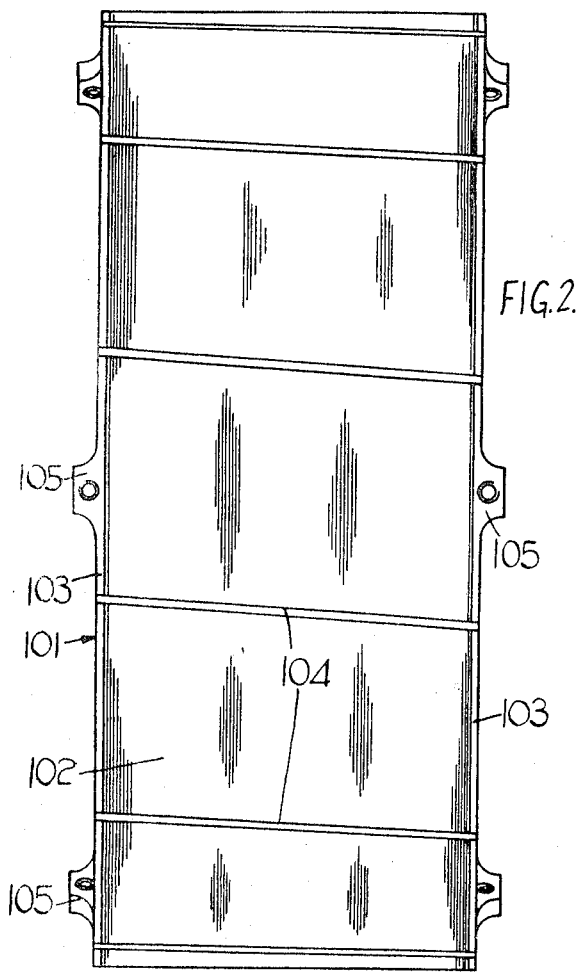
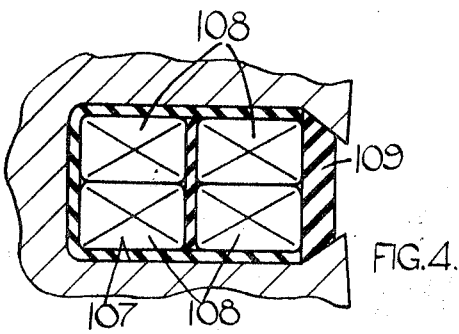
INVENTOR
DENNIS A. PANNELL
BY
ATTORNEYS

INVENTOR
DENNIS A. PANNELL
BY
ATTORNEYS

Aug. 12, 1969  D. A. PANNELL  3,461,331
COIL END SUPPORTS FOR SALIENT POLE ROTOR
Filed Feb. 8, 1968  4 Sheets-Sheet 4
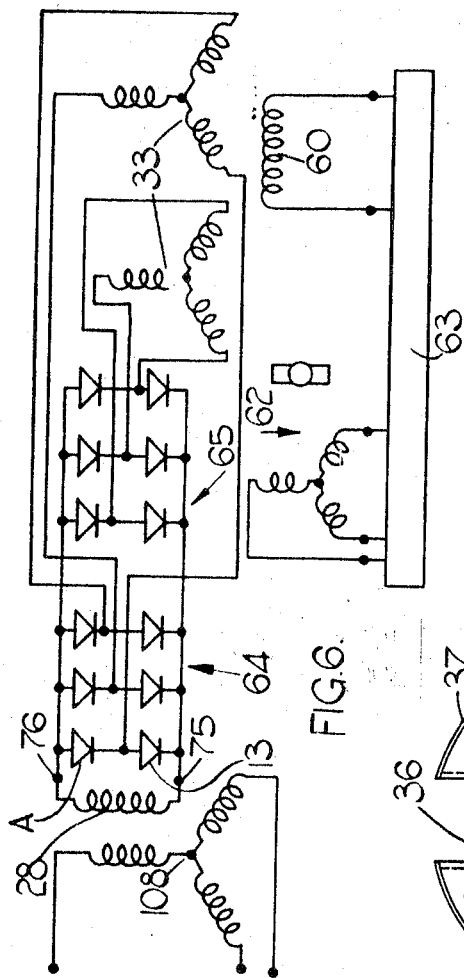
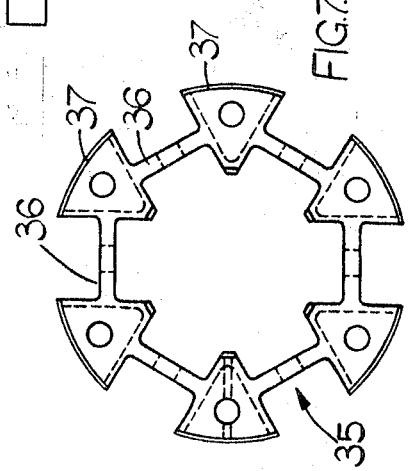
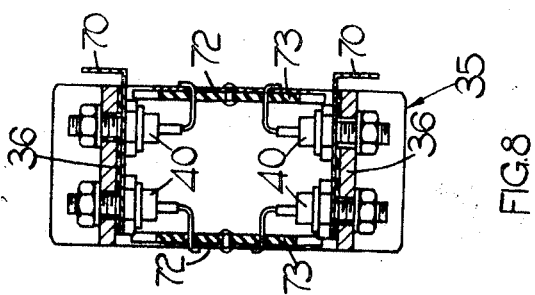
INVENTOR
DENNIS A. PANNELL
BY
ATTORNEYS

United States Patent Office 3,461,331
Patented Aug. 12, 1969

3,461,331
COIL END SUPPORTS FOR SALIENT POLE ROTOR
Dennis Alexander Pannell, Ickenham, England, assignor to Rotax Limited, London, England, a British company
Filed Feb. 8, 1968, Ser. No. 704,013
Int. Cl. H02k 3/46, 3/48
U.S. Cl. 310—270                    2 Claims

ABSTRACT OF THE DISCLOSURE

A dynamo electric machine comprising a rotor having salient pole pieces defining slots accommodating coils defined therebetween, and L-shaped members mounted at the axially opposite ends of the pole pieces, the members defining outwardly extending ledges which support the end portions of the coils.

---

This invention relates to dynamo electric machines of the kind comprising a rotor which is provided with a plurality of salient pole pieces, adjacent pole pieces defining slots, a plurality of coils being provided on the pole pieces respectively, the major portion of each coil being located within the slots on each side of the pole pieces and being retained therein.

When such machines are operated at high rotational speeds, the end portions of the coils are subjected to considerable centrifugal force, and the object of the present invention is to provide means for supporting the end portions of the coils.

According to the invention in a dynamo electric machine of the kind specified each pole piece carries a pair of support members at its axially opposite ends respectively, the support pieces defining axially extending circumferential ledges respectively against which the end portions respectively of the winding bear.

Figure 1:
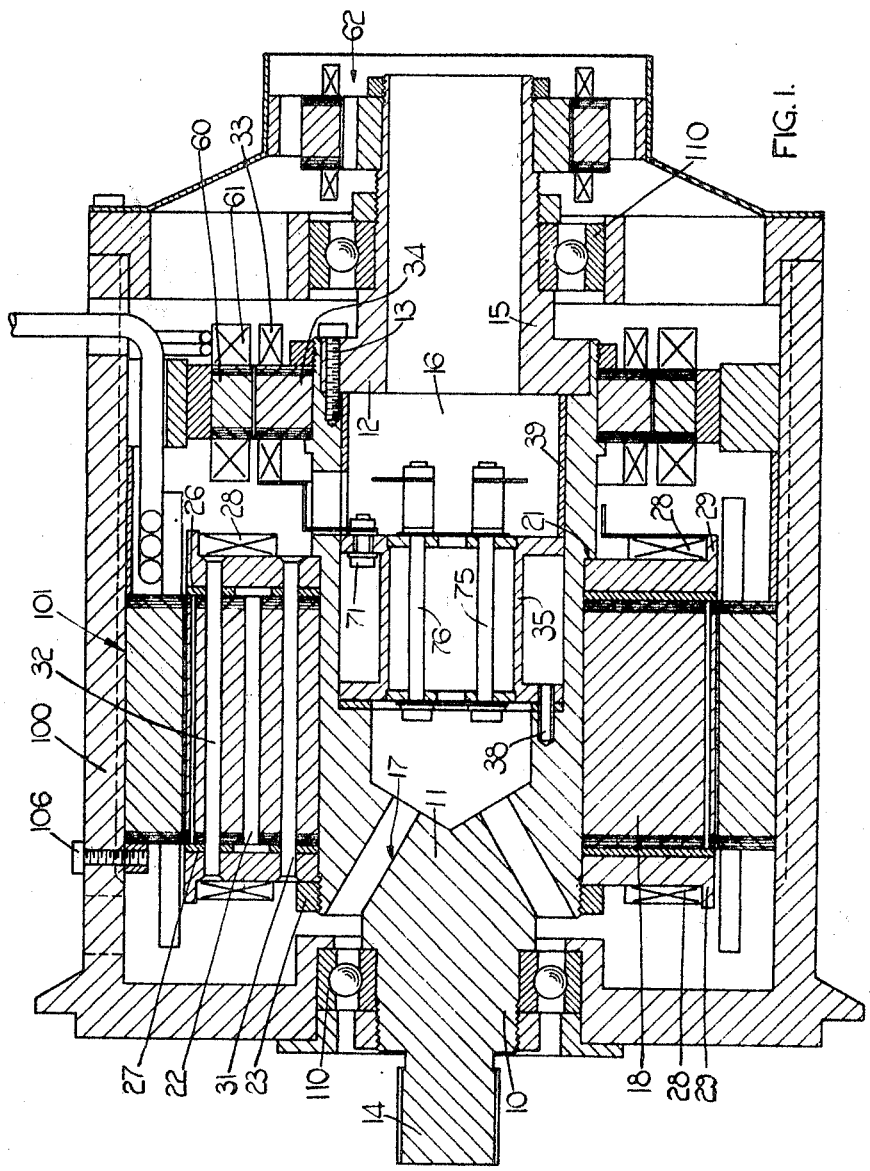
Figure 3:
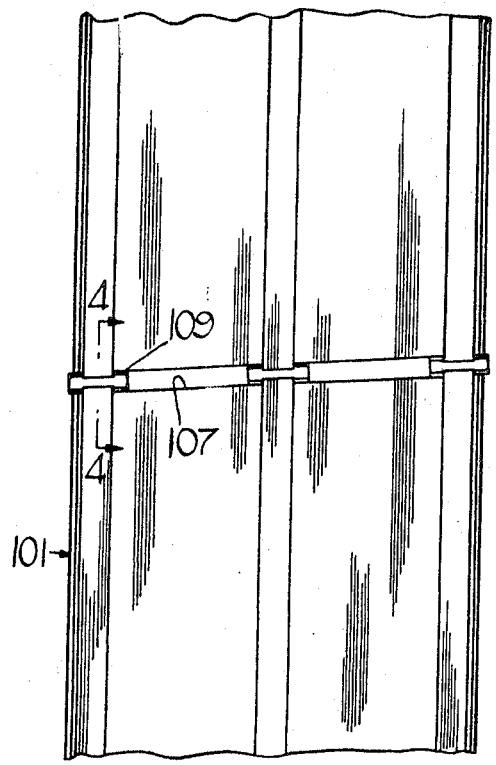
Figure 5:
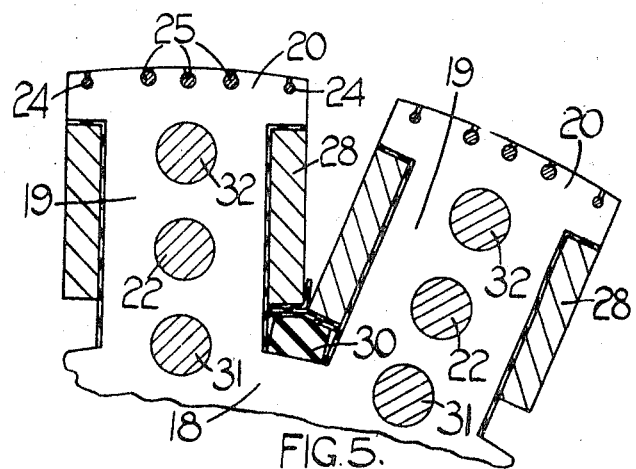

In the accompanying drawings:

FIGURE 1 is a sectional side elevation of one example of a dynamo electric machine in accordance with the invention, FIGURE 2 is an external view of the stator unit of FIGURE 1, FIGURE 3 is a view of the internal surface of part of the stator unit of FIGURE 1, FIGURE 4 is a section on the line 4—4 of FIGURE 3, FIGURE 5 is a section of part of the rotor of FIGURE 1, FIGURE 6 is an electrical circuit diagram of the machine, FIGURE 7 is an end view of part of the machine shown in FIGURE 1 with parts removed for the sake of clarity, and FIGURE 8 is a section through part of the machine shown in FIGURE 1 but taken on a different section line.

One example of a dynamo electric machine in accordance with the invention will now be described with reference to the accompanying drawings, the particular dynamo electric machine which is to be described is a high speed alternator, which may or may not have associated therewith a step-up gear box to ensure that the rotor of the alternator is rotating at the speed for which the machine is designed.

The machine comprises a casing 100 in which is mounted an annular stator structure 101 comprising as shown in FIGURES 2, 3 and 4, a stack of annular stator plates 102 at the opposite ends of which are positioned a pair of end plates 103 respectively. The plates 102 and 103 are secured relative to each other so as to form a unitary structure, by axially extending welds indicated at 104 on the outer periphery. Furthermore, the end plates are provided with lugs 105 each of which is provided with a threaded hole for the reception of screws 106 serving to secure the stator structure within the casing. On the internal periphery of the stator structure is provided a plurality of generally axially extending skewed slots 107 only one of which is shown, and which are rectangular in section throughout the majority of their length. The end portions of the slots together with a portion intermediate the ends are however partly closed as shown in FIGURE 4, this partial closure being achieved by shaping the slot apertures in the stator laminations. Mounted within the slots are windings constituted by separate coils 108 and in order to retain the windings within the slots wedge pieces 109 are provided at the partly closed portions of the slot. The particular advantage of this arrangement is that the cooling of the windings within the slots is facilitated and furthermore the leakage reactance is lower than for conventional arrangements. The coils are interconnected in known manner to provide a multiphase A.C. output.

Rotatably mounted within the casing upon bearings 110 is a rotor structure which is illustrated in FIGURE 1 of the drawings. The rotor structure comprises a hollow shaft 10 which is formed in two parts 11 and 12, the two parts being secured together by means of a plurality of bolts 13. The part 11 is provided with an input drive member 14 about which is mounted one of the bearings 110 by which the shaft is mounted for rotation within the casing. The part 12 defines a hollow tubular extension 15 which also carries the other bearing 110 for mounting the rotor structure within the casing. The two parts together define a chamber 16 within the shaft, and this chamber is provided with a plurality of outlet apertures 17 within the part 11. By this arrangement, cooling fluid can be passed through the extension 15 into the chamber 16, and can leave the chamber 16 through the apertures 17.

The part 11 of the shaft 10 carries an annular stack of laminations 18 which are in an interference fit upon the periphery of the shaft. As seen in FIGURE 5, each lamination of the stack of laminations 18 is shaped so as to provide a plurality of equi-angularly spaced and radially extending pole pieces 19 which terminate in pole heads 20 which extend circumferentially beyond the pole pieces 19.

Each lamination of the stack of laminations 18 is stamped from sheet material, and prior to the assembly of the stack of laminations upon the part 11 of the shaft, the laminations are secured together by rivets 22 which extend through the pole pieces respectively. The stack of laminations is assembled on the part 11 of the shaft and is retained against a step 21 or the part 11 by means of a retaining ring 23 which is screw-threadedly engaged upon the periphery of the part 11.

In each pole head is located a plurality of damping conductors, and as shown in FIGURE 5, five such conductors are provided. The outermost conductors 24 are of smaller diameter than the remaining conductors 25, and are located within the overhanging portions of the pole head. After the conductors 24 and 25 have been inserted within the apertures formed in the laminations, they are connected at their opposite ends respectively to a pair of copper end plates 26 and 27. Conveniently the connection is obtained by brazing the conductor to the end plates. In this manner the conductor becomes electrically connected so as to constitute damping windings, which encompass substantially the whole of each pole head. It should be noted that the heads of the rivets 22 are so arranged that they do not project beyond the plates 26 and 27.

Again, as shown in FIGURE 5, the pole pieces are surrounded by windings 28 which are of generally rectangular form, and which consist of a plurality of turns of copper strip wound so that each winding constitutes a stack. The windings are pre-formed, and are then assembled upon the pole pieces, a portion of a turn at a time. It should be noted that before the windings are placed in position upon the pole pieces, insulation is provided on the pole pieces to insulate the winding. In order to support the end portions of the windings 28, support members 29 are provided, and these are of generally L-shaped form, and define axially extending circumferential ledges against which the end portions of the windings can bear. The sequence of assembly of the winding and members 29 is important. As will be seen in FIGURE 5, there is a substantial gap between the innermost end of each stack of windings 28 and the adjacent peripheral surface of the annular portion of the stack of laminations, and this gap is normally occupied by a wedge member 30 which acts to retain the windings against the under side of the overlapping portions of the pole head. Before the wedge member 30 is put in position, the L-shaped members 29 are inserted adjacent the sides of the plates 26 and 27, and with the windings in their outermost positions as seen in FIGURE 5, rivets 31 are inserted which secure the L-shaped members 29 to the pole pieces, the plates 26 and 27 being sandwiched therebetween. After the rivets 31 have been inserted, the windings 28 are moved to their innermost position, and further rivets 32 inserted which similarly further secure the L-shaped members 29 to the pole pieces. Finally, the windings are returned to the position in which they are seen in FIGURE 5, and the wedge members 30 inserted. By this construction, the whole of the winding stack 28 is supported against movement under the action of centrifugal force.

In an alternative construction not shown, the plates 26 and 27 are omitted, and the end laminations of the stack of laminations 18 are formed from thicker section material to which the ends of the damping conductors 24 and 25 are secured. The thicker laminations may be constructed from high strength copper-beryllium alloy, or alternatively, they may be formed from suitable ferrous material, the electrical conductivity of which has been improved by plating with a low resistance material such as copper or silver. This method of construction has the advantage that the support for the L-shaped members 29 is improved.

The windings 28 are supplied with rectified alternating current from a pair of windings 33 wound upon a rotor structure 34. Rectifying means (to be described is provided in the chamber 16 for rectifying the alternating current produced by the windings 33. Also mounted within the casing is a stator structure 60 which is associated with the rotor structure 34 and this stator structure has a winding 61 which derives its energising current from a permanent magnet alternator 62, the stator of which is mounted within the casing, and the rotor of which is mounted about the tubular extension 15. The current flowing in the energising winding 61 of the stator structure 60 is controlled by means indicated at 63, external of the machine, and by this means the output of the machine as a whole can be controlled.

The rectifying means comprises two bridge rectifiers 64, 65, which are associated with the windings 33 respectively and by this arrangement in the event that one of the windings 33 or alternatively one of the bridge rectifiers fails, the other winding 33 together with its associated bridge rectifier, can supply current to the windings 28 so that the machine is still capable of producing an output.

As shown in FIGURE 1, there is provided within the chamber 16, a heat sink 35, and an end view of the heat sink is shown in FIGURE 7. The heat sink is formed as a die casting, and includes a plurality of axially extending ledges 36, which are interconnected at their opposite sides by a plurality of axially extending bosses 37, the bosses being of arcuate hollow form. The heat sink 35 is positioned within the chamber with the peripheral surfaces of the bosses in contact with the wall of the chamber such that the bosses 37 do not cover the apertures 17 and a plurality of locating pins 38 are provided to prevent angular movement of the heat sink relative to the shaft. The heat sink is restrained against axial movement within the chamber by means of an extended portion 39 of the part 12 of the shaft.

The ledges 36 extend in planes which are substantially normal to a radius from the axis of rotation of the shaft, and upon each ledge is mounted a pair of diode rectifiers 40 forming one arm of one of the pair of bridge rectifiers respectively. Each diode 40 includes a base portion which is provided with a threaded stud, and the base portion carries a dice of semi-conductor material. The rectifiers are mounted upon the ledges with the base portions innermost, so that as the rotor rotates, the effect of centrifugal force will be to retain the dice upon the base portions. In this manner the diode rectifiers can withstand the high centrifugal force which occurs when the shaft is being rotated at high speeds.

The diode rectifiers are insulated from the ledge upon which they are mounted and the rectifiers on one ledge form one arm of the particular pair of bridge rectifiers for example the rectifiers A and B of FIGURE 6. These two rectifiers are of opposite type, in other words in the case of rectifier A, the cathode is connected to the base portion whereas in the case of rectifier B it is the anode which is connected to the base portion. The base portions of the two rectifiers are connected together by a metal plate 70 and this plate is extended circumferentially and is connected to a terminal 71 which is insulated from the heat sink 35. Terminal 71 is connected to one of the phase connections of one of the windings 33. The other electrodes of the rectifiers are connected respectively to a pair of metal plates 72, which are mounted respectively upon a pair of electrically insulating spider plates 73 mounted on the heat sink. The plates 73 support a pair of terminals 75 and 76 which are connected to the ends respectively of the winding 28. The terminals 75 and 76 are electrically connected to the plates 72 respectively so that in use they will be of positive and negative polarity.

In use, cooling fluid is passed through the hollow extension 15 into the chambers 16, and this effectively cools the heat sink, and consequently, the diode rectifiers 40. By outwardly inclining the passages 17 relative to the axis of rotation of the rotor, there is a natural tendency for the cooling fluid to be drawn through the tubular extension 15 by the action of centrifugal force.

Having thus described my invention what I claim as new and desire to secure by Letters Patent is:

1. A dynamo electric machine of the kind specified in which each pole piece is provided with a pair of support members at its axially opposite ends respectively, the support pieces defining axially extending circumferential ledges respectively against which the end portions respectively of the winding bear.

2. A dynamo electric machine as claimed in claim 1 in which said members are of generally L-shaped form, and are secured to the pole pieces by rivets extending through the pole pieces.

References Cited

UNITED STATES PATENTS

| | | | |
|---|---|---|---|
| 1,695,391 | 12/1928 | Schou | 310—183 |
| 3,106,654 | 10/1963 | Wesolowski | 310—61 |
| 3,339,097 | 8/1967 | Dunn | 310—194 |
| 3,365,600 | 1/1968 | Penn | 310—270 |

WARREN E. RAY, Primary Examiner

U.S. Cl. X.R.

310—61, 64, 68, 114, 183, 194